United States Patent [19]

Nagao et al.

[11] Patent Number: 5,735,627
[45] Date of Patent: Apr. 7, 1998

[54] ARTICULATING MECHANISM FOR ROBOT

[75] Inventors: Wataru Nagao; Shingi Takahashi. both of Yokohama, Japan

[73] Assignee: Tokico Ltd., Kanagawa-Ken, Japan

[21] Appl. No.: 699,114

[22] Filed: Aug. 16, 1996

[30] Foreign Application Priority Data

Aug. 30, 1995 [JP] Japan .................. 7-222371

[51] Int. Cl.$^6$ .................. B05B 3/12; B25J 17/02; F16L 39/04
[52] U.S. Cl. .................. 403/38; 403/34; 403/81; 901/29; 901/43; 285/147.3
[58] Field of Search .................. 901/29, 43, 26; 239/587.2; 118/323; 285/134, 136, 132, 131, 147.3, 147.1, 272, 184; 403/38, 39, 34, 53, 81

[56] References Cited

U.S. PATENT DOCUMENTS

| | | | |
|---|---|---|---|
| 2,698,664 | 1/1955 | Freeman | 239/587.2 X |
| 3,575,060 | 4/1971 | Warren | 239/587.2 X |
| 4,708,580 | 11/1987 | Akeel | 901/29 X |
| 4,771,652 | 9/1988 | Zimmer | 901/29 X |
| 4,823,279 | 4/1989 | Perzley et al. | 901/29 X |
| 4,841,795 | 6/1989 | Obrietan | 901/29 X |
| 5,429,682 | 7/1995 | Harlow, Jr. et al. | 901/43 X |

FOREIGN PATENT DOCUMENTS

| | | |
|---|---|---|
| 2-97590 | 8/1990 | Japan . |
| 4-97687 | 8/1992 | Japan . |

*Primary Examiner*—Anthony Knight
*Attorney, Agent, or Firm*—Pearne, Gordon, McCoy & Granger LLP

[57] ABSTRACT

An articulating mechanism for use in a single- or multiple-fluid-path painting robot is presented. The articulation design is particularly suitable as a wrist-joint and is free from the problems of dead space and single-fluid-path limitations found in conventional wrist-joint designs. The mechanism is based on coupling two cylindrical casings coaxially so that arm casing, wrist casing and the flange ends are coaxially joint about a shaft axis. The end sections of each components are sealed while leaving a fluid space of a given spacing between the outer and inner casings. The casings provide a fluid passage space extending in the direction of the casings and is provided with fluid delivery holes for the delivery of paint and other fluid medium. The designs include a blocking member so that cleaning of the robotic device, and quick maintenance or color changes can be carried out during production operation.

11 Claims, 11 Drawing Sheets

ARTICULATING MECHANISM FOR ROBOT

BACKGROUND OF THE INVENTION

1. Field of the Invention

The present invention relates in general to articulating mechanism for industrial robots, and relates in particular to an articulating wrist-joint suitable for use in painting robots.

2. Description of the Related Art

Robotic painting devices have been disclosed in, for example, Practical Utility Model, Laid-open Publication H2-97590 and, Practical Utility Model, Laid-open Publication H4-96787. In the former reference, a robotic painting device disclosed is based on a wrist mechanism having a swivel shaft protruding from a mid-section thereof, which a paint delivery tube is connected through which the liquid paint is made to flow. In the latter reference, a robotic painting device disclosed is based on a wrist mechanism having a fluid delivery passage formed in the rotational center of a wrist mechanism.

In the former design, because the paint delivery tube is connected to the rotation section of the wrist mechanism, it is necessary to allow for a dead space to be generated in the spray pattern produced by the painting robot. Also, because the painting gun and the output section of the paint passage are separated, there is a danger that a hose connecting the two becoming tangled during the painting operation.

In the latter design, because the paint passage is provided in the rotational center of the wrist mechanism, only one fluid path could be provided for the painting robot.

SUMMARY OF THE INVENTION

It is an object of the present invention to provide an articulating mechanism comprising: two cylindrical casing members rotatably coupled about a shaft axis common to both so that an end section of one casing members is superimposed coaxially within an end section of the other casing member; wherein the end sections are superimposed so as to generate a closed-end fluid passage space of a given separation distance; and each of the cylindrical casing members is provided with a fluid communication hole on a wall section so that one end of the fluid communication hole communicates with the fluid passage space, and other end of the fluid communication hole communicates with a fluid path for delivery of a fluid medium.

In the articulating mechanism presented above, it is also permissible to divide the fluid passage space into a plurality of spaces along the shaft axis of the end sections so that each of the spaces is connected to a fluid path by means of the fluid communication hole, and the end sections can be made freely detachable from the casing members. It is desirable that the tip dimension of the blocking member be less than the dimension of an end opening facing the tip of the blocking member.

It is also possible to design an articulating mechanism in which one of the superimposed end sections is provided with a blocking member which protrudes into the fluid passage space so as to block the flow of a fluid medium flowing in the circumferential direction of the space.

In the design of the blocking member, it is also desirable that the tip dimension of the blocking member is less than the dimension of an opening of the fluid communication hole to the fluid passage space. It is also desirable that the blocking member be positioned adjacent to the location of the fluid communication hole.

Another variation in the design of the articulating mechanism is that the fluid path is constituted by a pipe member disposed along the longitudinal direction in the casing member.

DESCRIPTION OF THE PREFERRED EMBODIMENTS

In the following, preferred embodiments will be described with reference to drawings.

It should be noted in the following descriptions that leading end of a component part refers to that end which is closer to the painting gun and the tail end refers to that end which is away from the painting gun or closer to the base section of the robotic device.

Figure 1:
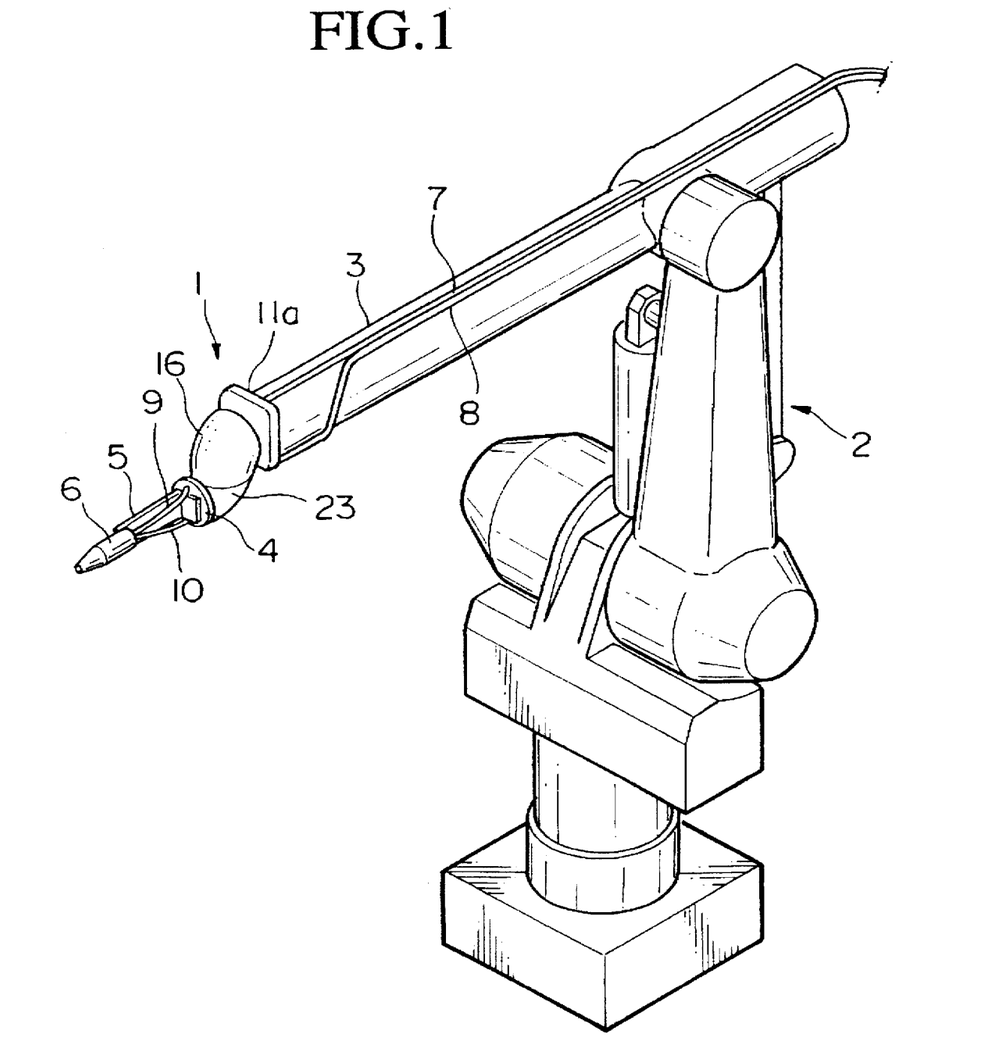
FIG. 1 is a perspective view of an example of a wrist-joint based on the articulating mechanism of the present invention applied to a painting robot.
Figure 2:
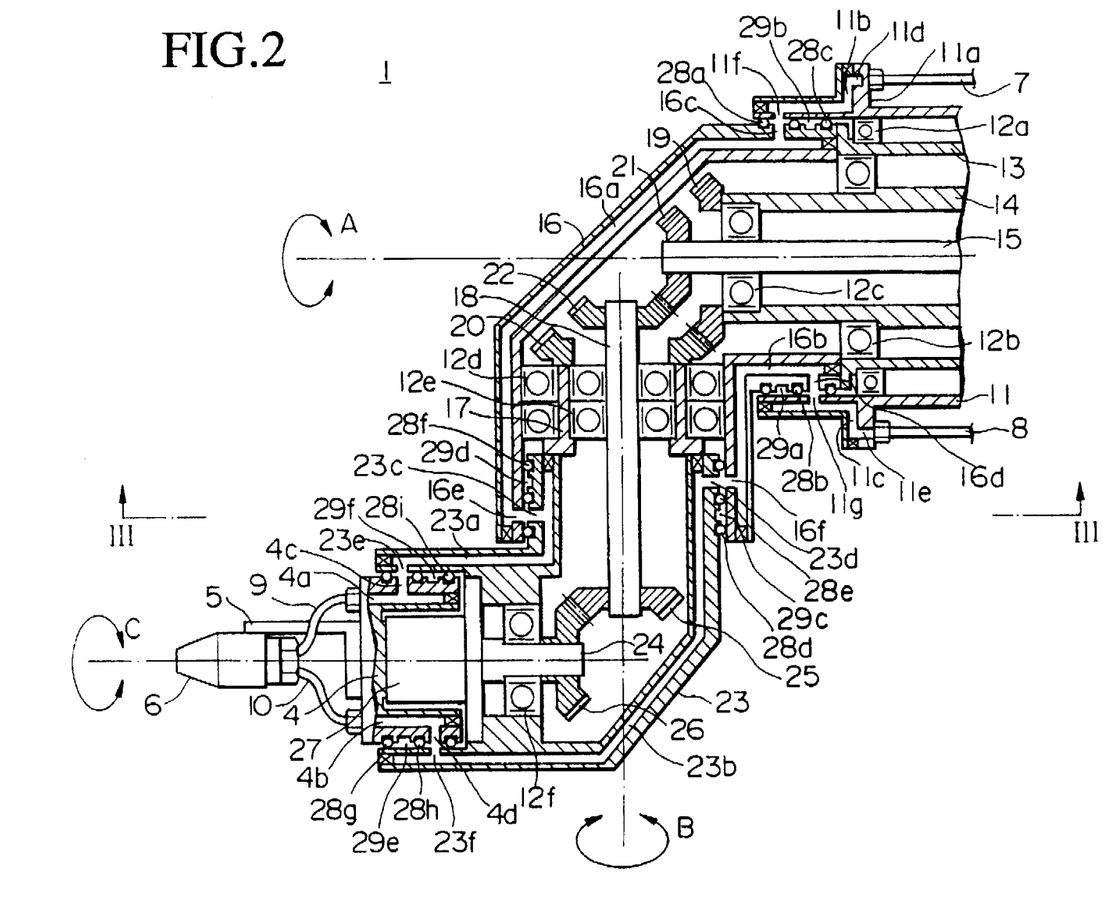
FIG. 2 is a vertical cross sectional view of another example of the articulating mechanism.

FIG. 1 is a perspective view of an application of the articulating mechanism 1 of the present invention to a wrist-joint of a painting robot capable of producing rotation motions about the three axes, A, B and C, shown in FIG. 2.

The articulating mechanism 1 is attached to the leading end of an arm 3 of the painting robot 2, and a flange (casing member) 4, attached to the leading end of the articulating mechanism 1, has a bracket 5 for holding a painting gun 6. The painting gun 6 is supplied with paint, air and other fluid media which are required for the performance of the painting robot through fluid delivery tubes (fluid paths) 7, 8. The fluid delivery tubes 7, 8 (hereinbelow shortened to tubes) originate from fluid supply sources (not shown) and are connected to a flange section 11a of an arm casing (to be described later) 11 by way of one side of an arm 3. The flange 4 and the painting gun 6 are connected through tubes (fluid paths) 9, 10.

The structural configuration of the articulating mechanism 1 is shown in FIG. 2. The arm 3 comprises a cylindrical arm casing (casing member) 11 housing a shaft 13 freely rotatably supported by means of a bearing 12a. Inside the shaft 13, there is disposed another shaft 14 freely rotatably supported by means of a bearing 12b, and inside the shaft 14, there is disposed yet another shaft 15 freely rotatably supported by means of a bearing 12c.

A cylindrical wrist casing (casing member) 16 is inserted into the arm casing 11 from the leading end to be attached to the leading end of shaft 13, and internally supports a freely rotatable shaft 17 by means of a bearing 12d. In the inside of shaft 17, there is disposed another shaft 18 freely rotatably support by means of a bearing 12e.

The shafts 14, 17 are jointly operable through beveled gears 19, 20 attached to the end sections of the shafts 14, 17, and the shafts 15, 18 are jointly operable through beveled gears 21, 22 attached to the end sections thereof.

A cylindrical wrist casing (casing member) 23 is inserted into the wrist casing 16 from the leading end to be attached to the leading end of shaft 17, and internally supports a freely rotatable shaft 24 by means of a bearing 12f. The shafts 18, 24 are jointly operable through beveled gears 25, 26 attached to the end sections thereof.

The leading end of the wrist casing 23 is provided with a speed reducer 27 having a input section (not shown) which is connected to the leading end of shaft 24, and the output section of the speed reducer 27 is provided with a flange member 4 which is inserted from the leading end to be radially coupled to the wrist casing 23. The painting gun 6 is attached to the flange member 4, as described above, by means of a bracket 5.

The fluid medium flows to the painting gun 6 through fluid paths (pipe member) 11b and 11c having respective sealed ends, along the longitudinal direction in the interior of the wall section of the arm casing 11. The fluid paths 11b, 11c are connected to the tubes 7, 8 through respective openings 11d, 11e at the tail end surface of the flange section 11a of the painting robot.

The end of the arm casing 11 is superimposed coaxially with the end of the arm casing 16 so that a plurality of ring-shaped fluid passage spaces 29a and 29b are formed in the longitudinal direction between the inner surface of the arm casing 11 and the outer surface of the wrist casing 16 by means of the sealing members 28a, 28b and 28c. Fluid communication holes 11f, 11g are formed, in the fluid paths 11b, 11c so as to face the fluid passage spaces 29a, 29b (hereinbelow shortened to spaces), respectively, thereby providing an independent fluid path to communicate the fluid path 11b with the space 29a through the fluid communication hole 11f on the one hand, and the fluid path 11c and the space 29b through the fluid communication hole 11g on the other.

Similarly, within the wall section of the wrist casing 16, fluid paths 16a, 16b having end seals are formed in the longitudinal direction of the wrist casing 16. Fluid communication holes 16c, 16d are formed in the fluid paths 16a, 16b towards the spaces 29a, 29b, respectively, thereby providing an independent fluid path to communicate the fluid path 16a with the space 29a through the fluid communication hole 16c on the one hand, and the fluid path 16b and the space 29b through the fluid communication hole 16d on the other.

The end of the wrist casing 16 is superimposed coaxially with the end of the wrist casing 23 so that a plurality of ring-shaped spaces 29c, 29d by means of the sealing members 28d, 28e and 28f in the longitudinal direction between the inner surface of the wrist casing 16 and the outer surface of the wrist. Fluid communication holes 16e, 16f are formed in the fluid paths 16a, 16b to face the spaces 29c, 29d, respectively, thereby providing an independent fluid path to communicate the fluid path 16a with the space 29c through the fluid communication hole 16e on the one hand, and the fluid path 16b and the space 29d through the fluid communication hole 16f on the other.

Similarly, within the wall section of the wrist casing 23, fluid paths 23a, 23b having end seals are formed in the longitudinal direction of the wrist casing 23. Fluid communication holes 23c, 23d are formed in the fluid paths 23a, 23b to face the spaces 29c, 29d, respectively, thereby providing an independent fluid path to communicate the fluid path 23a with the space 29c through the fluid communication hole 23c on the one hand, and the fluid path 23b and the space 29d through the fluid communication hole 23d on the other.

Inside the leading end of the wrist casing 23, ends of the flange sections (casing member) 4 are superimposed coaxially so that a plurality of ring-shaped spaces 29e, 29f are formed in the longitudinal direction between the inner surface of the wrist casing 23 and the outer surface of the flange section 4 by means of the sealing members 28g, 28h and 28i. Fluid communication holes 23e, 23f are formed in the fluid paths 23a, 23b to face the spaces 29e, 29f, respectively, thereby providing an independent fluid path to communicate with the fluid path 23a with the space 29e through the fluid communication hole 23e on the one hand, and the fluid path 23b and the space 29f through the fluid communication hole 23f on the other.

Within the wall section of the flange 4, fluid paths (pipe member) 4a, 4b are formed extending in the longitudinal direction of flange 4. Further, fluid communication holes 4c, 4d are formed in the fluid paths 4a, 4b, thereby providing an independent fluid path to communicate the fluid path 4a with the space 29e through the fluid communication hole 4c on the one hand, and the fluid path 4b with the space 29f through the fluid communication hole 4d on the other hand. Here again, the leading ends of the fluid paths 4a, 4b are communicated with the painting gun 6 through the tubes 9, 10.

The operation of the articulating mechanism 1 will be explained in the following. As the shaft 13 is rotated, the wrist casing 16 rotates about the shaft axis A. When the shaft 14 is rotated, the rotation motion is transmitted to the shaft 17 through the beveled gears 19, 20, and the wrist casing 23 rotates about the shaft axis B. When the shaft 15 is rotated, the rotation motion is transmitted to the shaft 24 through the beveled gear 21, 22; shaft 18; and the beveled gears 25, 26. The rotation motion is inputted into the speed reducer 27, thus resulting in the rotation of flange 4 about the shaft axis C.

In the meantime, paint and air (fluid medium) supplied from the paint material supply source flows from the tubes 7, 8 through the fluid holes 11d, 11e to flow into the fluid paths 11b, 11c to arrive at the spaces 29a, 29b through the fluid communication holes 11f, 11g. The paint and air reaching the spaces 29a, 29b flow into the fluid paths 16a, 16b through the fluid communication holes 16c, 16d. The fluid media further travel through the fluid communication holes 16e, 11f; spaces 29c, 29d; fluid communication holes 23c, 23d; fluid paths 23a, 23b; fluid communication holes 23e, 23f; spaces 29e, 29f; fluid communication holes 4c, 4d; fluid paths 4a, 4b; and the tubes 9, 10 to be sprayed from the painting gun 6.

Figure 3:
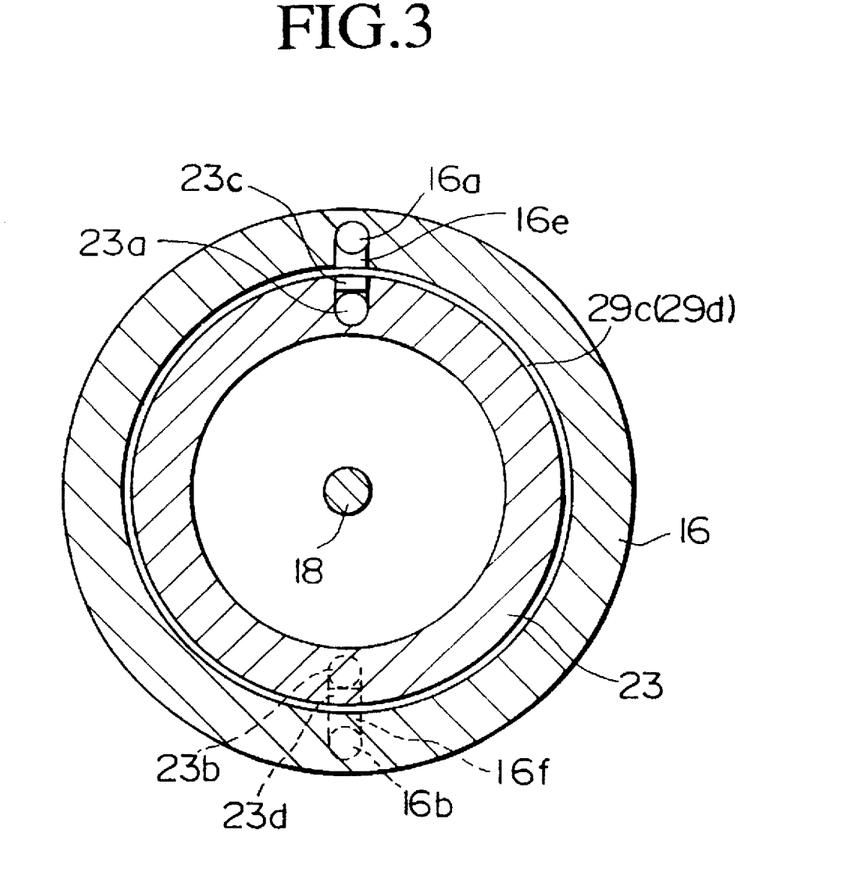
FIG. 3 is a cross sectional view of a section through a plane III—III shown in FIG. 2.

Here, it should be noted that, as shown in FIG. 3, each of the individual spaces 29a~29f (in FIG. 3, 29c and 29d) are formed in a ring form about the respective rotation axes of the articulating mechanism 1. Therefore, the fluid communication holes (in FIG. 3, 16e, 16f, 23c and 23d) are always open to the spaces 29a~29f, thus always enabling to secure the fluid paths from the tubes 7, 8 to the painting gun 6.

Furthermore, because the ends of the spaces 29a~29f are sealed with sealing members 28a~28i, thereby ensuring that the fluid media do not leak out of the individual spaces 29a~29f. The result is that the fluid media are prevented from entering into the interior of the articulating mechanism 1, thereby increasing the service life of gears and bearings, as well as preventing leaking of grease from the gear and bearings. Because the sealing members are hermetic, cleaning can be carried out with organic solvents such as paint thinner. Because the articulating mechanism incorporates a swivel joint, paint material serves as a lubricant, and the paint material does not readily become viscous.

The design eliminates an exposure of tube in the rotation section of the articulating mechanism, thereby eliminating the dead space and preventing interference with the workpiece. Since there is no need to pass the fluid delivery tube through the center of the rotation of the articulating mechanism 1, there is no mechanical interference with between the tubes and the shaft, thereby eliminating tube breakage.

Furthermore, since the fluid communication holes and the spaces 29a~29f are formed so as to be surrounding the shafts coaxially, the overall external diameter size of the joint can be made small. Additionally, the casing members are separated from the torque transmission members, therefore, the casing members are not subjected to loading. The result is that deformation from loading on the casing members is prevented, thereby permitting the use of light weight casing members, and enabling to utilize anti-friction materials to increase the service life of the casing members.

Figure 4:
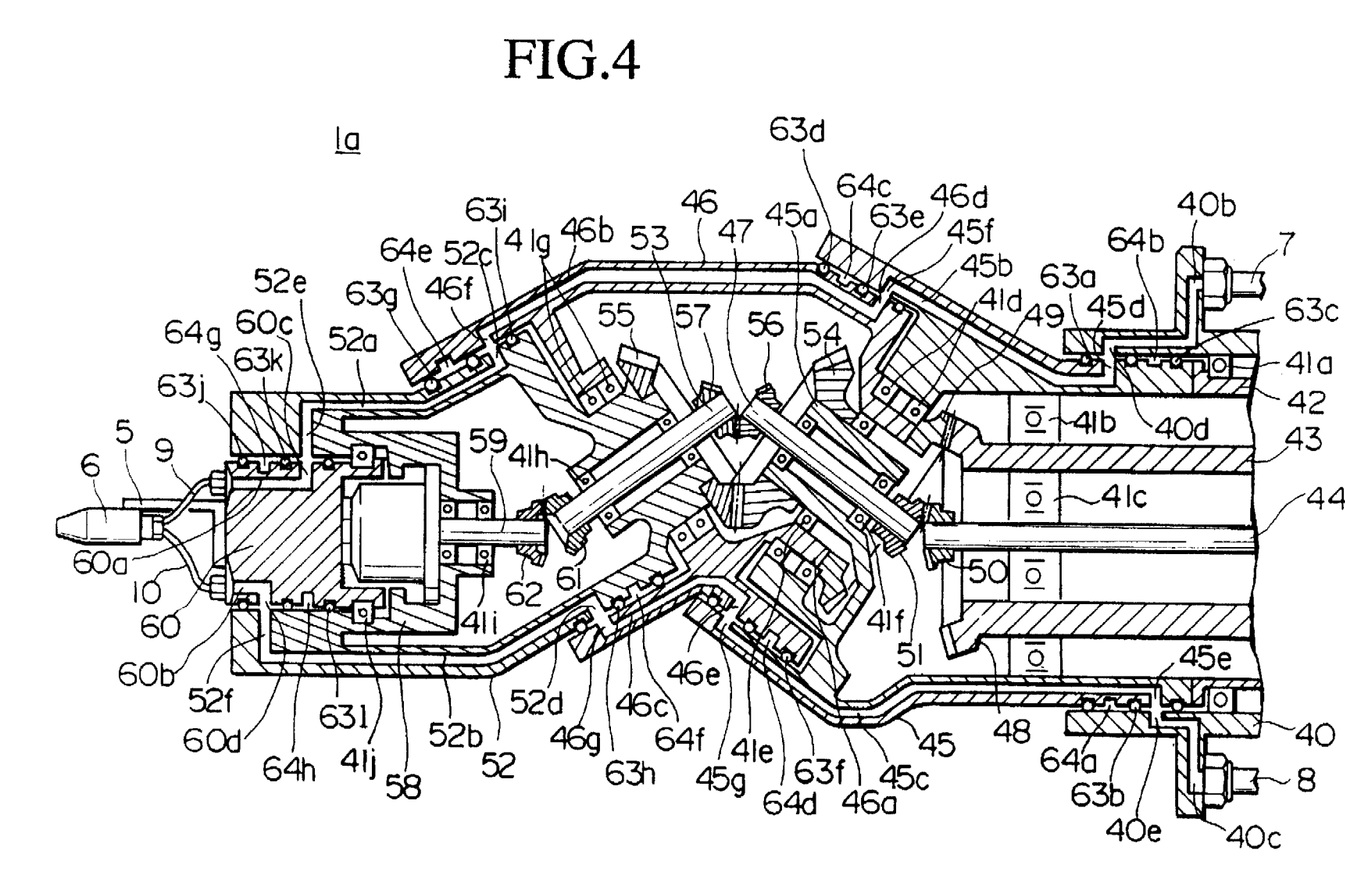
FIG. 4 is a vertical cross sectional view of the structure of another example of the articulating mechanism.
Figure 5:
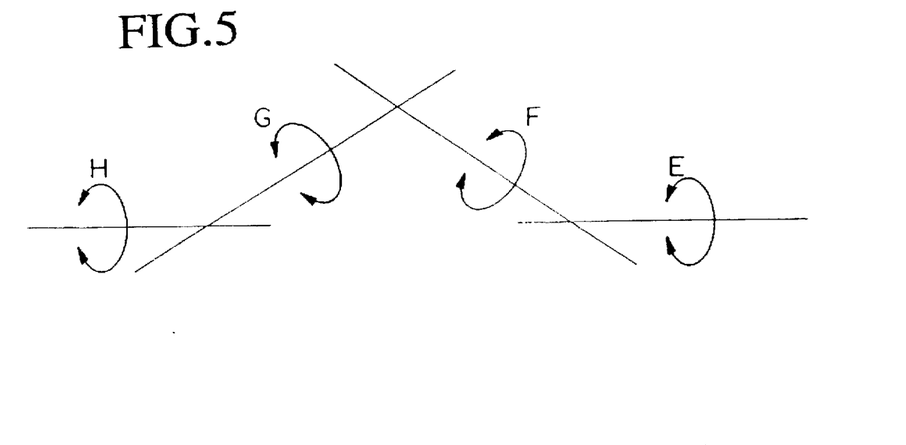
FIG. 5 shows rotational axes of the articulating mechanisms shown in FIGS. 4 and 6.

FIG. 4 shows an application of the articulating mechanism 1a to a wrist-joint of a painting robot capable of providing a four-fold rotation about the axes E, F, G and H illustrated in FIG. 5.

The mechanism for an arm 3 is encased in an arm casing (casing member) 40 and includes an internal shaft 42 which is freely rotatably supported by a bearing 41a. Inside the shaft 42, a shaft 43 is freely rotatably supported by a bearing 41b, and inside the shaft 43, a shaft 44 is freely rotatably supported by a bearing 41c.

A wrist casing 45 is inserted from the leading end into the arm casing 40 to be positioned at the leading end of the shaft 41, and the shaft section 46a of the wrist casing 46 is freely rotatably supported on the wrist casing 45 by a bearing 41d. The shaft section 45a of the wrist casing 45 is freely rotatably supported on the shaft section 46a by a bearing 41e, and a shaft 47 is freely rotatably supported on the shaft section 45a by a bearing 41f.

The shaft 43 and the wrist casing 46 are coupled to each other by a pair of beveled gears 48, 49, and shaft 44 and shaft 47 are coupled to each other by a pair of beveled gears 50, 51 attached to their ends.

A wrist casing (casing member) 52 is inserted from the leading end into the wrist casing 46, and is freely rotatably supported on the wrist casing 46 by a bearing 41g. On the inside of the wrist casing 46, a shaft 53 is freely rotatably supported thereon by a bearing 41h. The shaft section 45a of the wrist casing 45 and the wrist casing 52 are coupled to each other by a pair of beveled gears 54, 55, and shaft 47 and shaft 53 are coupled to each other by a pair of beveled gears 56, 57 attached to their ends.

At the leading end of the wrist casing 52, there is disposed a speed reducer 58 having an input section (not shown) and a shaft 59 supported by the bearing 41 while the output section (not shown) of the speed reducer 58 is provided with a flange (casing member) 60. The flange 60 is freely rotatably supported on the inside of the wrist casing 52 by a bearing 41j, and the painting gun 6 is attached to the flange 60 by means of a bracket 5. The shafts 53, 59 are coupled to each other by a pair of beveled gears 61, 62 attached to their ends.

The fluid paths (pipe member) 40b, 40c are provided along the longitudinal interior wall of the arm casing 40. Also, tubes 7, 8 are communicated with the fluid paths 40b, 40c disposed near the tail end of the fluid paths 40b, 40c.

The end of the arm casing 40 is superimposed coaxially with the end of the wrist casing 45 so that a plurality of ring-shaped spaces 64a, 64b are formed in the longitudinal direction between the inner surface of the arm casing 40 and the outer surface of the wrist casing 45 by means of the sealing members 63a, 63b and 63c. Fluid communication holes 40d, 40e are formed facing towards the spaces 64a, 64b, respectively, in the fluid paths 40b, 40c thereby providing an independent fluid path to communicate the fluid path 40b with the space 64a through the fluid communication hole 40d on the one hand, and the fluid path 40c and the space 64b through the fluid communication hole 40e on the other.

Similarly, within the wall section of the wrist casing 45, fluid paths 45b, 45c are formed in the longitudinal direction of the wrist casing 45. Fluid communication holes 45d, 45e are formed in the fluid paths 45b, 45c facing towards the spaces 64a, 64b, respectively, thereby providing an independent fluid path to communicate the fluid path 45b, with the space 64a through the fluid communication hole 45d on the one hand, and the fluid path 45c and the space 64b through the fluid communication hole 45e on the other.

The end of the arm casing 45 is superimposed coaxially with the end of the wrist casing 46 so that a plurality of ring-shaped spaces 64c, 64d are formed in the longitudinal direction between the inner surface of the wrist casing 45 and the outer surface of the wrist casing 46 by means of the sealing members 63d, 63e and 63f. Fluid communication holes 45f, 45g are formed in the fluid paths 45b, 45c facing towards the spaces 64c, 64d, respectively, thereby providing an independent fluid path to communicate the fluid path 45b with the space 64d through the fluid path 45f on the one hand, and the fluid path 45c and the space 64c through the fluid communication hole 45g on the other.

Similarly, within the wall section of the wrist casing 46, fluid paths 46b, 46c are formed in the longitudinal direction of the wrist casing 46. Fluid communication holes 46d, 46e are formed in the fluid paths 46b, 46c facing towards the spaces 64c, 64d, respectively, thereby providing an independent fluid path to communicate the fluid path 46b with the space 64d through the fluid communication hole 46d on the one hand, and the fluid path 46c and the space 64c through the fluid communication hole 46e on the other.

The end of the wrist casing 46 is superimposed coaxially with the end of the wrist casing 52 so that a plurality of ring-shaped spaces 64e, 64f are formed in the longitudinal direction between the inner surface of the wrist casing 46 and the outer surface of the wrist casing 52 by means of the sealing members 63g, 63h and 63i. Fluid communication holes 46f, 46g are formed in the fluid paths 46b, 46c facing towards the spaces 64e, 64f, respectively, thereby providing an independent fluid path to communicate the fluid path 46b with the space 64f through the fluid communication hole 46f on the one hand, and the fluid path 46c and the space 64e through the fluid communication hole 46g on the other.

Similarly, within the wall section of the wrist casing 52, fluid paths 52a, 52b are formed in the longitudinal direction of the wrist casing 52. Fluid communication holes 52c, 52d are formed in the fluid paths 52a, 52b facing towards the spaces 64e, 64f, respectively, thereby providing an independent fluid path to communicate the fluid path 52a with the space 64f through the fluid communication hole 52c on the one hand, and the fluid path 52b and the space 64e through the fluid communication hole 52d on the other.

Inside the wall section of the wrist casing 52, ends of the flange sections (casing member) 60 are superimposed coaxially so that a plurality of ring-shaped spaces 64g, 64h are formed in the longitudinal direction between the inner surface of the wrist casing 52 and the outer surface of the flange section 60 by means of the sealing members 63j, 63k and 63l. Fluid communication holes 52e, 52f are formed in the fluid paths 52a, 52b facing towards the spaces 64g, 64h, respectively, thereby providing an independent fluid path to communicate the fluid path 52a with the space 64h through the fluid communication hole 52e on the one hand, and the fluid path 52b and the space 64g through the fluid communication hole 52f on the other.

Within the wall section of the flange 60, fluid paths (pipe member) 60a, 60b are formed extending in the longitudinal direction of flange 60. Also, fluid communication holes 60c, 60d are formed in the fluid paths 60a, 60b towards the spaces 64g, 64h, thereby providing an independent fluid path to communicate the fluid path 60a with the space 64h through the fluid communication hole 60c on the one hand, and the fluid path 60b with the space 64g through the fluid communication hole 60d on the other hand. Here again, the leading ends of the fluid paths 60a, 60b are communicated with the painting gun 6 through the tubes 9, 10.

In the articulating mechanism 1a presented above, paint and air (fluid medium) supplied from the paint material supply source flows from the tubes 7, 8 into the fluid paths 40b, 40c through the fluid communication holes 40d, 40e to arrive at the spaces 64a, 64b. The paint and air reaching the spaces 64a, 64b pass through the fluid communication holes 45d, 45e, fluid paths 45b, 45c, fluid communication holes 45f, 45g; spaces 64c, 64d; fluid communication holes 46d, 46e; fluid paths 46b, 46c; fluid communication holes 46f, 46g; spaces 64e, 64f; fluid communication holes 52c, 52d; fluid paths 52a, 52b; fluid communication holes 52e, 52f; spaces 64g, 64h; fluid communication holes 60c, 60d; fluid paths 60a, 60b and the tubes 9, 10 to be sprayed from the painting gun 6.

Similar to the case shown in FIG. 3, each of the individual spaces 64a~64h are formed in a ring form about the respective rotation axes of the articulating mechanism 1a. Therefore, the fluid communication holes are always open to the spaces 64a~64h, thus guaranteeing the fluid paths from the tubes 7, 8 to the painting gun 6 in this case also.

Furthermore, because the ends of the spaces 64a~64h are sealed with sealing members 63a~63l, thereby ensuring that the fluid media do not leak out of the individual spaces 64a~64h. In this case also, the tubes are not exposed in the rotation section of the articulating mechanism 1a. Furthermore, since the fluid communication holes and the spaces 64a~64f are formed coaxially to surround the shafts, the overall external diameter size of the joint can be made small, and additionally, because the casing members are separated from the torque transmission members, the casing members are not subjected to loading. It can be seen therefore that the articulating mechanism 1a provides all the same beneficial effects derived from the articulating mechanism 1 shown in the first embodiment.

Figure 6:
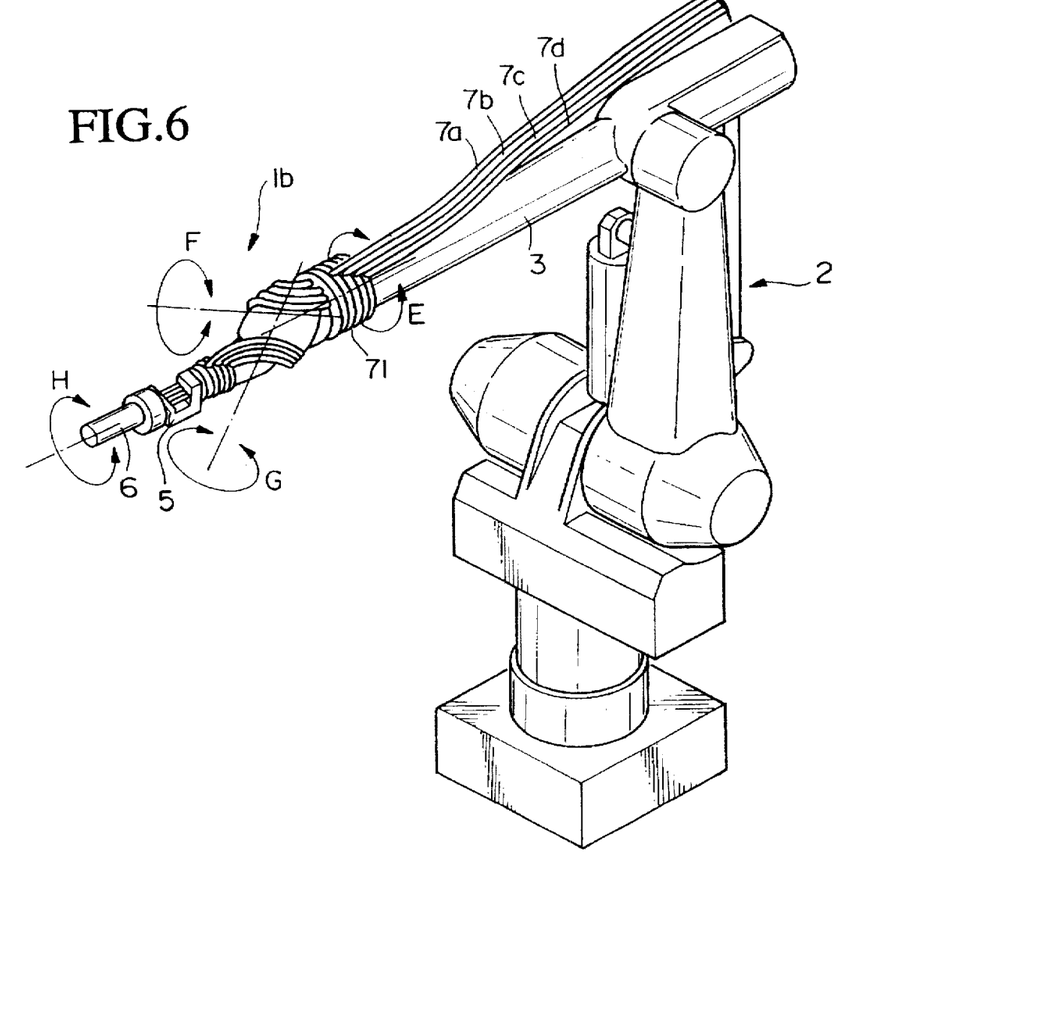
FIG. 6 is a perspective view of a painting robot provided with a wrist-joint based on the articulating mechanism of the present invention.

FIG. 6 shows an application of another articulating mechanism 1b to an elbow joint of a painting robot having a capability of four-fold rotation about the axes E, F, G and H shown in FIG. 5 and having four systems of fluid paths for transport of painting materials.

The articulating mechanism 1b is attached to the leading end of an arm 3 of a painting robot 2, and a painting gun 6 is attached to the leading end of the articulating mechanism 1b by means of a bracket 5. There are four systems of fluid delivery tubes, 7a, 7b, 7c and 7d, and the tubes 7a~7d which originate from a paint and air supply source (not shown) are connected to the base section (designated as 71 in FIG. 6) of the articulating mechanism 1b by extending along a side section of the arm 3.

Figure 7:
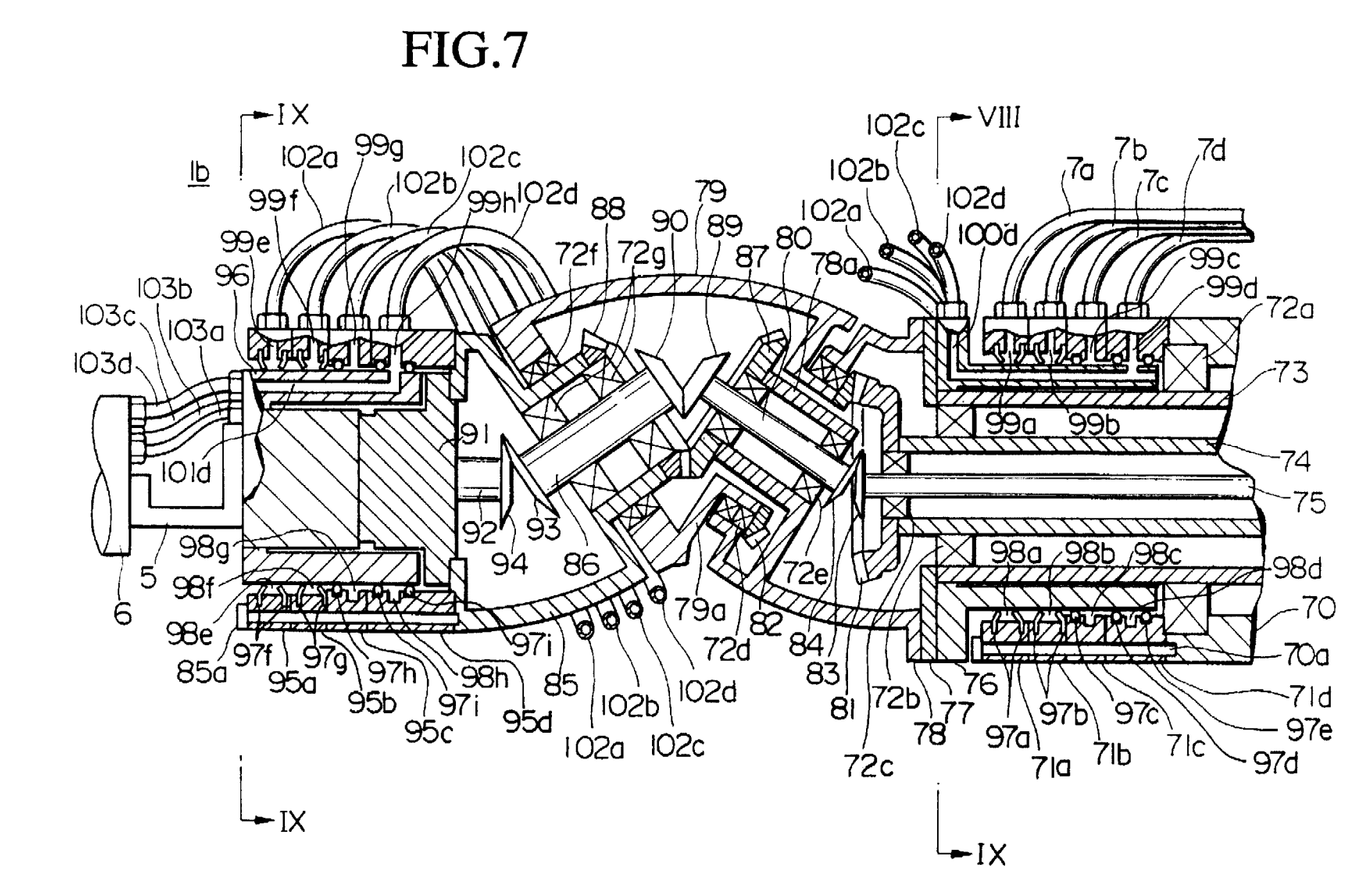
FIG. 7 is a vertical cross sectional view of the structure of another articulating mechanism.

FIG. 7 shows the structural details of the articulating mechanism 1b. The arm 3 is housed in an arm casing (casing member) 70, and axial swivel members 71a, 71b, 71c and 71d are aligned coaxially with the shaft axis of the arm casing 70, with their end surfaces in contact with each other, and are mounted at the leading end of arm 3. The axial swivel members 71a~71d are detachably attached to the arm casing 70 by means of fastener devices 70a.

A shaft 73 is freely rotatably supported on the arm casing 70 by a bearing 72a, and a shaft 74 is freely rotatably supported in the interior of shaft 73 by a bearing 72b. Also, a shaft 75 is freely rotatably supported in the interior of shaft 74 by a bearing 72c.

A swivel shaft 76 is inserted into the axial swivel members 71a~71d and is fixed to the leading outer section of shaft 73, and a wrist casing (casing member) 78 is attached to the leading end of the swivel shaft 76 by means of a flange 77. A shaft section 79a of the wrist casing 79 is freely rotatably supported on the wrist casing 78 by a bearing 72d, and a shaft 80 is freely rotatably supported on the shaft section 78a of the wrist casing 78 by a bearing 72e.

Further, the shaft 74 and the wrist casing 79 are operably coupled through a pair of beveled gears 81, 82 attached to the respective ends, and the shaft 75 and the shaft 80 are operably coupled through a pair of beveled gears 83, 84 attached to the respective ends.

A wrist casing (casing member) 85 is inserted into a wrist casing 79 from the leading end, and is freely rotatably supported on the wrist casing 79 by a bearing 72f, and another shaft 86 is freely rotatably supported in the interior of the wrist casing 85 by a bearing 72g. The shaft section 78a of the wrist casing 78 and the wrist casing 85 are operably coupled through a pair of beveled gears 87, 88 attached to the respective ends, and the shaft 80 and the shaft 86 are operably coupled through a pair of beveled gears 89, 90 attached to the respective ends.

At the leading end of the wrist casing 85, there is disposed a speed reducer 91 having a freely rotatable shaft 92 attached to an input section (not shown) of the speed reducer 91, and the output section (not shown) of the speed reducer 91 is provided with a painting gun 6 mounted on a bracket 5. The shafts 86, 92 are operably coupled to each other by a pair of beveled gears 93, 94 attached to their ends.

Axial swivel members 95a, 95b, 95c and 95d of a ring shape are aligned coaxially with the leading end of the wrist casing 85, and with their end surfaces in contact with each other. The axial swivel members 95a~95d are detachably attached to the wrist casing 85 by means of fastener devices 85a.

Another swivel shaft 96 is inserted from the leading end into the axial swivel members 95a~95d and is fixed to the outer leading end of the speed reducer 91.

Further, between the inner surface of the axial swivel members 71a~71d, 95a~95d and the outer surface of the swivel shafts 76, 96, there are a plurality of spaces 98a~98h formed in the longitudinal direction by ring shaped sealing members 97a~97j provided on the inner circumferential surface of the axial swivel members 71a~71d, 95a~95d.

Figure 8:
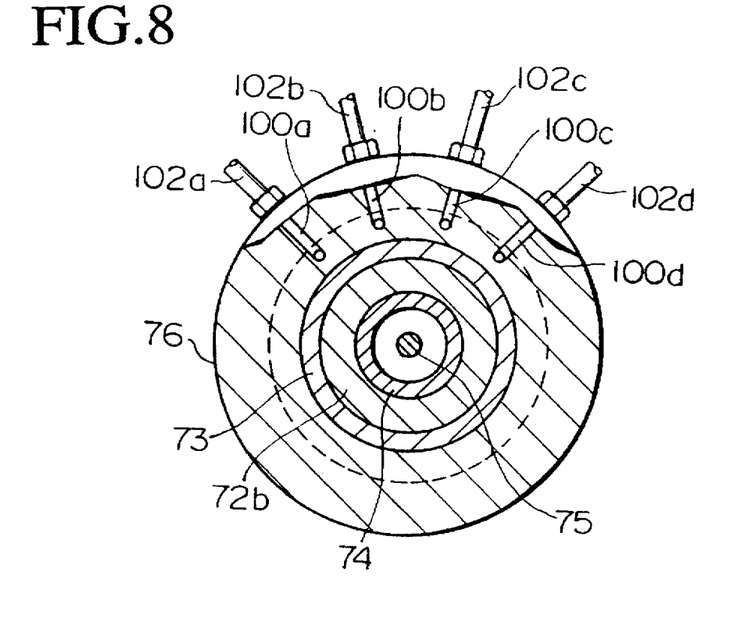
FIG. 8 is a partial horizontal cross sectional view of a section of the articulating mechanism through a plane VIII—VIII in FIG. 7.
Figure 9:
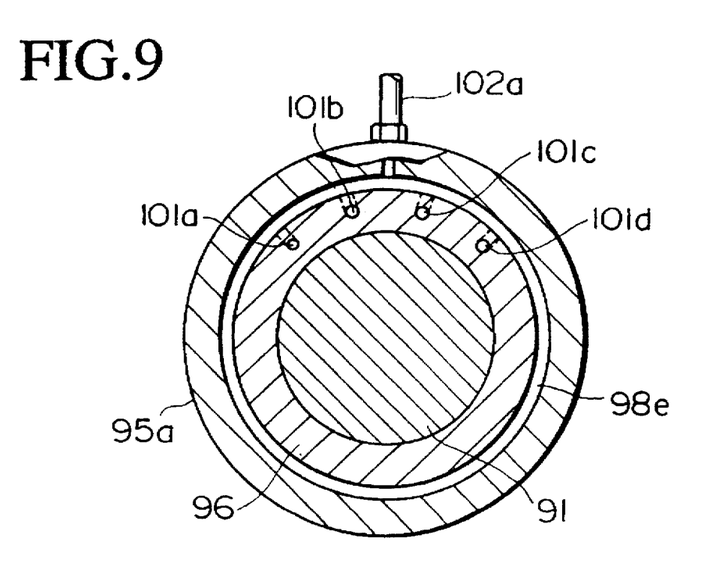
FIG. 9 is a partial horizontal cross sectional view of a section of the articulating mechanism through a plane IX—IX in FIG. 7.

The axial swivel members 71a~71d, 95a~95d are provided with fluid communication holes 99a~99h extending from the outer radial direction towards the spaces 98a~98h. Fluid communication holes 100a~100d, 101a~101d are formed to extend inside the wall section along the longitudinal direction of the swivel shafts 76, 96, and in parallel along the circumferential direction of the swivel shafts 76, 96 as illustrated in FIGS. 8 and 9.

The ends of the fluid communication holes 100a~100d, 101a~101d are open towards the spaces 98a~98h at the base section. Further, the leading ends of the fluid communication holes 100a~100d are open to the leading outer surface of the swivel shaft 76, and the ends of the fluid communication holes 101a~101d are open to the leading surface of the swivel shaft 96.

The fluid communication holes 99a~99d are communicated with the corresponding leading ends of the tubes 7a~7d, and the leading ends of the fluid communication holes 100a~100d and the fluid communication holes 99a~99d are joined to the corresponding tubes (fluid paths) 102a~102d which are wound loosely to spiral around the outer surfaces of the wrist casings 78, 79 and 85. The leading ends of the fluid communication holes 101a~101d are joint to the painting gun 6 by each of the corresponding tubes (fluid paths) 103a~103d.

The above configuration permits independent fluid connections to be made between the tubes 7a and 103a; tubes 7b and 103b; tubes 7c and 103c; and finally 7d and 103d; through the fluid communication holes 99a~99d; spaces 98a~98d; fluid communication holes 100a~100d; tubes 102a~102d; fluid communication holes 99e~99h; spaces 98e~98h; and finally the fluid communication holes 101a~101d.

Paint and air (fluid medium) supplied from the paint material supply source flows from the tubes 7a, 7d through the fluid communication holes 99a~99d to the spaces 98a~98d. The paint and air reaching the spaces 98a~98d similarly pass through the fluid communication holes 100a~100d; the tubes 102a~102d; fluid communication holes 99e~99h; spaces 98e~98h; fluid communication holes 101a~101d; and finally through tubes 103a~103d to be sprayed from the painting gun 6.

Therefore, similar to the case of the articulating mechanisms 1, 1a, the articulating mechanism 1b also features that each of the individual spaces 98a~98h is formed in a ring shape about the respective rotation axes of the articulating mechanism 1b. Therefore, in the articulating mechanism 1b also, the fluid communication holes are always open to the fluid delivery spaces 98a~98h, thus guaranteeing to secure the fluid paths from the tubes 7a~7d to the painting gun 6.

Furthermore, because the ends of the fluid passage spaces 98a~98h are sealed with sealing members 97a~97j, it is ensured that the fluid media do not leak out of the individual spaces 98a~98h. In this case also, there is no exposure of the fluid delivery tube in the rotation section of the articulating mechanism 1b. Furthermore, since the fluid communication holes and the spaces 98a~98f are formed coaxially to surround the shafts, the overall external diameter size of the joint can be made small, and additionally, because the casing members are separated from the torque transmission members, the casing members are not subjected to loading. It can be seen therefore that the articulating mechanism 1b provides all of the same beneficial effects derived from the articulating mechanisms 1, 1a shown in the previous embodiments.

In the design of the articulating mechanism 1b, axial swivel members 71a~71d and 95a~95d are all detachably attached the arm casings 70, 85 by means of such fasteners as 70a, 85. Therefore, in addition to the same benefits derived from the articulating mechanisms 1, 1b maintenance tasks, such as exchanging sealing members 97a~97j or cleaning of the axial swivel members 71a~71d and 95a~95d, are facilitated.

It should be noted that, because the axial swivel members 71a~71d, 95a~95d are separated from the arm casing 70 or wrist casing 85, the direction of pulling out the tubes 7a~7d, 102a~102d from the axial swivel members 71a~71d, 95a~95d can be freely selected along the circumference of the axial swivel members 71a~71d, 95a~95d, and furthermore, the design of the articulating mechanism 1b allows sealing members 97a~97j to be selected freely to suit the type of paint material used.

It should also be noted that in the articulating mechanism 1b, the wrist casings 78, 79 and 85 do not rotate relative to each other, and therefore, the tubes 102a~102d do not display twisting about their axes. It follows that the slack in the lengths of the tubes 102a~102d to be provided can be determined only on the need for the extent of bending required for the wrist casings 78.79 and 85.

Figure 10:
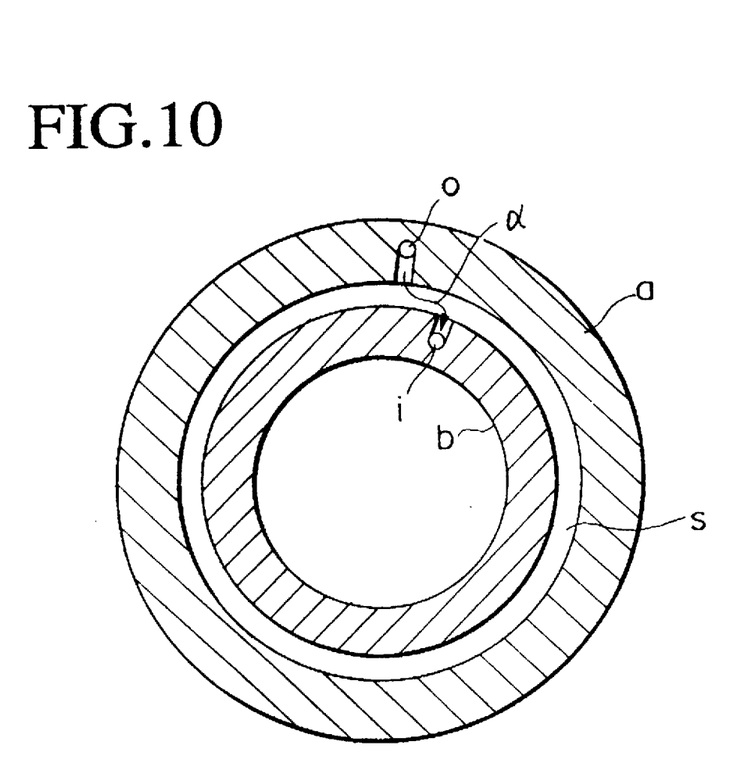
FIG. 10 is a horizontal cross sectional view showing the flow of fluid through the articulating mechanism.

In the articulating mechanisms 1, 1a and 1b presented above, the fluid medium flows down, as illustrated in FIG. 10, through a fluid path formed in the outer casing member a (designated in FIG. 10 as output port o) to pass through a spacing s to reach a fluid path formed in the inner casing member (designated in FIG. 10 as input port i). Therefore, when the distance between the output port o and the input port i is short, thorough cleaning of the entire fluid path may be difficult in some cases, because the cleaning fluid may short circuit between the ports as illustrated by a fluid path α in FIG. 10.

Figure 11:
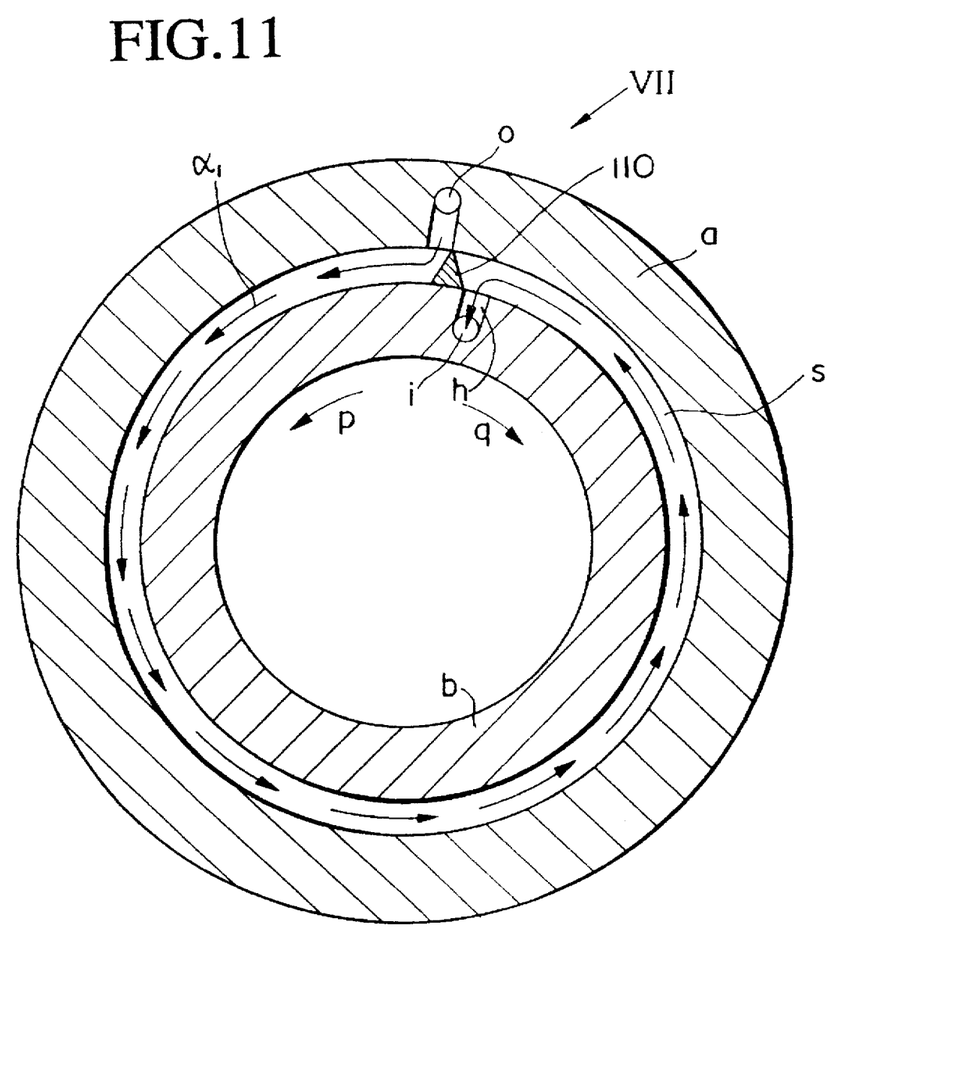
FIG. 11 is a horizontal cross sectional view showing the location of a blocking member and its effect on the flow of the fluid.
Figure 12:
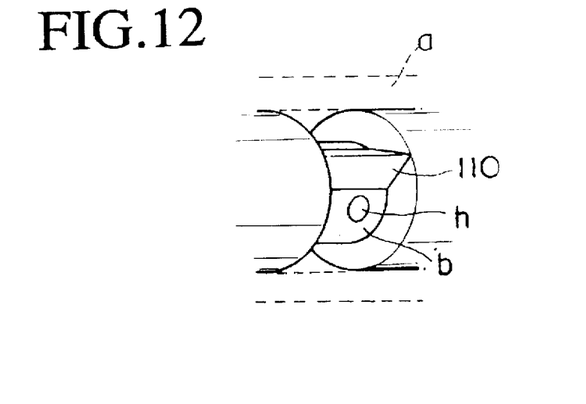
FIG. 12 is a perspective view of the blocking member of the articulating mechanism seen along the arrow XII shown in FIG. 11.

Such a situation can be countered by providing a blocking member 110, as shown in FIG. 11 for example, within the individual spacing s. The blocking member 110 is a wedge shaped piece protruding out from one of the opposing casings a or b to the opposing casing b or a, and extending in the longitudinal direction of the casings a, b, so that the tip of the blocking member 110 touches the opposing casing member. The result is that the input fluid is prevented from short circuiting to the output port. It is desirable that the blocking member 110 be positioned adjacent to the fluid communication hole h, as shown in FIGS. 11 and 12.

The presence of the blocking member 110 directs the fluid entering from the output port o into the spacing s flows in the direction shown by the fluid path α1 in FIG. 11 along the spacing s to reach the input port i. Especially, for changing paint or cleaning of the spacing s, the fluid should be charged into the spacing s after rotating the casing members a, b so as to position the blocking member 110 such that the output and input ports are positioned as close as possible with the blocking member 110 intervening therebetween. By doing so, it can be assured that the cleaning fluid, for example, will flow down over the entire circumference of the spacing s, thus resulting in improving the product quality produced immediately after a color change, as well as shortening the time required for effecting a color change.

Although it is more efficient to have a short path because the fluid experiences less resistance in a shorter distance, it is necessary, that the fluid should flow over the entire length of the circumference of the spacing s for cleaning purposes. The relationship between the range of relative motion of the casing members a, b and the position of the blocking member 110 will be explained with reference to FIG. 11, which shows a case of the blocking member 110 provided on the casing member b. There are two methods for determining the position of the blocking member in relation to the range of motion of the casing required for the operation of the robotic device.

Figure 13:
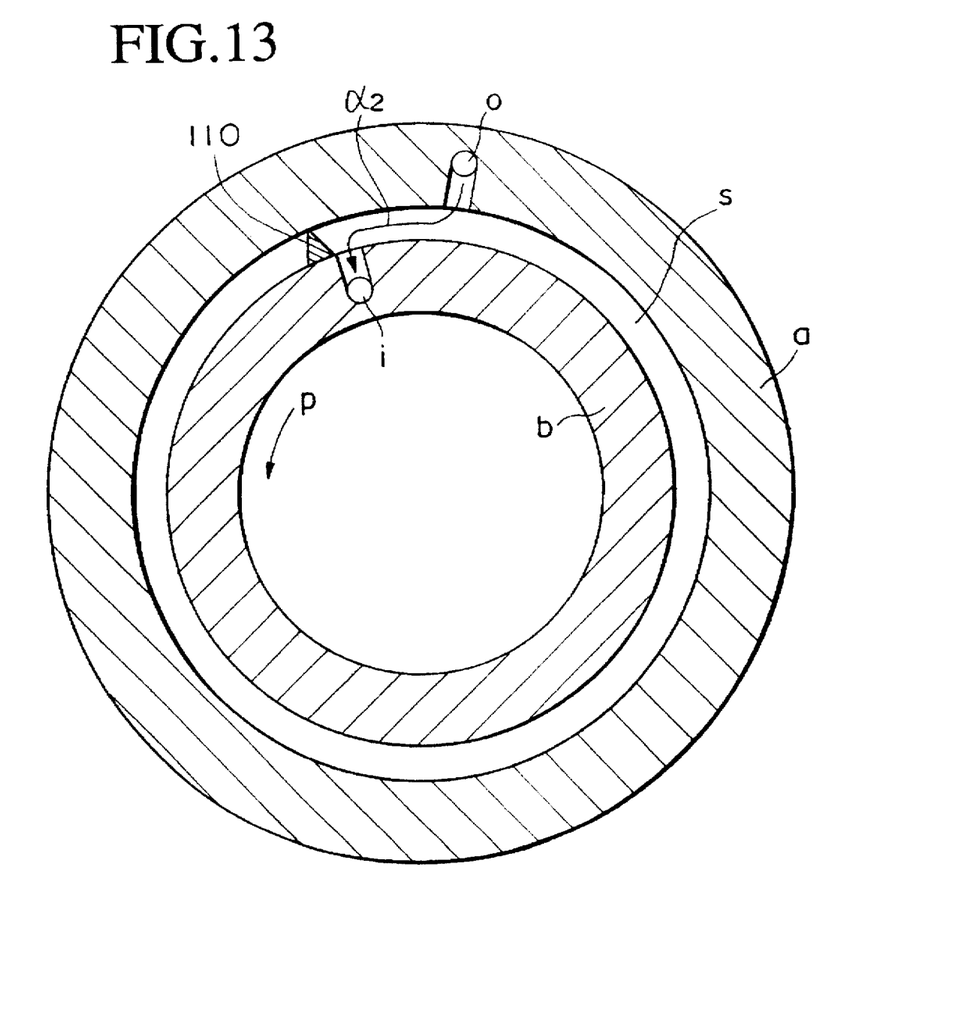
FIG. 13 is a horizontal cross sectional view showing the effect of the blocking member of the articulating mechanism.

In the first method, the extreme edge of the motion range is aligned with the cleaning position as shown in FIG. 11 while positioning the blocking member 110 on the edge of the opening, of the casing member b, opposite to the intended direction of rotation motion, which is designated as p in FIG. 11. The fluid during the operation of the robotic device flows in the direction indicated by a fluid path α2 in FIG. 13, and if the motion range is limited to below 180°, the total path length of the fluid rarely exceeds ½ of the circumference. Further, when the blocking member 110 is placed at the extreme edge of the motion range as shown in FIG. 11, the blocking member 110 can be accurately returned to the position for cleaning.

In the second method, the blocking member 110 is placed in the middle of the motion range shown in FIG. 11 indicated by directions p and q. In this method, it is slightly more difficult to position the blocking member 110 accurately compared with the first method, but the method presents an advantage that the amount of rotation required to return the casing member b to the position indicated in FIG. 11 is short, and in the worst case, it does not exceeds ½ of the motion range.

Figure 14:
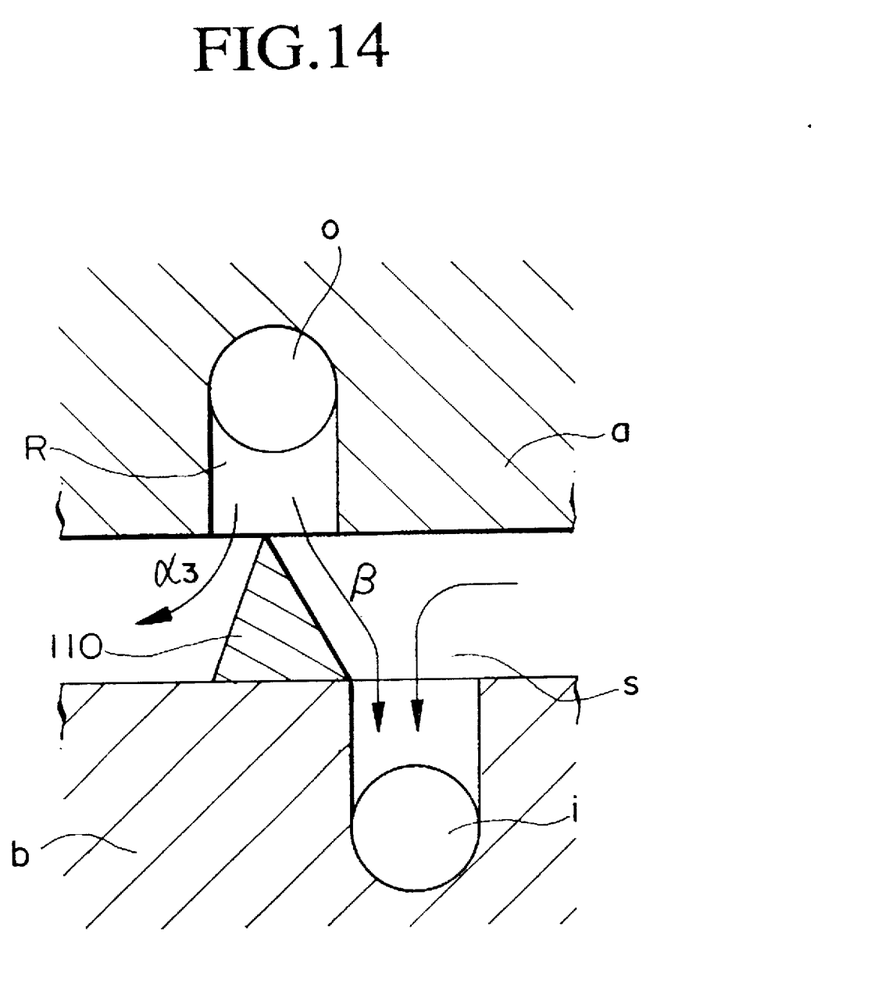
FIG. 14 is an enlarged cross sectional view showing the effect of the blocking member of the articulating mechanism.

Further advantage of the design is that, because the blocking member 110 is wedge shaped, even if the blocking member 110 is stopped within an opening of either the output port o or input port i, as illustrated in FIG. 14, there is no danger of the blocking member 110 affecting the flow of paint during the operation of the robotic device. This is because the paint medium is able to flow in both directions, shown by fluid paths α3 and β in FIG. 14 to reliably supply the paint medium into the spacing s, by flowing along the side surfaces of the blocking member 110. To achieve this effect, it is not mandatory that the blocking member 110 be wedge shaped, and the same effect can be achieved if the dimension of the tip of the blocking member 110 is less than the radius of the fluid communication hole R.

In the articulating mechanisms presented above, in the articulating mechanisms 1, 1a, there are two independent fluid delivery tube systems (from tubes 7, 8 to tubes 9, 10) while in the articulating mechanism 1b, there are four independent fluid delivery systems (from tubes 7a–7d to tubes 103a–103d) provided to deliver paint to the painting gun 6, however, it is obvious that one fluid delivery system may be sufficient in some cases.

In summary of the advantages of the articulating mechanism of the present invention, the fluid path from the fluid delivery tube to the paint gun is fully secured at all times. The fluid passage spaces formed in the rotation sections are hermetically sealed by sealing members so that paint medium and grease are prevented from leaking from the fluid paths, thus enabling cleaning of the fluid paths with cleaning fluid such as paint thinner.

Further, since none of the fluid delivery tubes is exposed in the rotation section of the articulating mechanism, dead space is not generated, and there is no opportunity for mechanical interference of the tube with the workpiece. Further, because there is no need for passing the tube through the rotational center section of the articulating mechanism, there is no mechanical interference of the tube and the shaft, thereby eliminating any chances for tube breakage.

Furthermore, because the fluid communication holes and the fluid passage spaces are coaxially placed around the circumference, the outer dimension of the robotic device can be made small. In addition, the casing members are provided separate from the torque transmission members, there is no loading on the casing members. The result is that casing members are not subjected to deformation, thereby permitting to reduce the weight of the casing members and to utilize anti-friction materials to increase the service life of the sealing members.

What is claimed is:

1. An articulating mechanism for providing a wrist-joint action in a robotic device comprising at least three cylindrical casing members rotatably coupled in series about each shaft axis of said casing members so that an end section of one casing member is overlapped coaxially within an end section of another casing member, wherein said end sections are overlapped so as to form a closed-end fluid passage space of a given separation distance, and each of said cylindrical casing, members is provided with a fluid communication hole in a wall section so that one end of said fluid communication hole communicates with said fluid passage space, and another end of said fluid communication hole communicates with a fluid path for delivery of a fluid medium.

2. An articulating mechanism for providing a wrist-joint action in a robotic device comprising at least three cylindrical casing members rotatably coupled in series about each shaft axis of said casing members so that an end section of one casing member is overlapped coaxially within an end section of another casing member, wherein said end sections are overlapped so as to form a closed-end fluid passage space of a given separation distance, and each of said cylindrical casing members is provided with a fluid communication hole in a wall section so that said fluid communication hole communicates with adjacent fluid passage spaces for delivery of a fluid medium.

3. An articulating mechanism as claimed in claim 1, wherein one of said one end section or said another end section is provided with a blocking member protruding into said fluid passage space so as to block said fluid medium from flowing in a circumferential direction of said fluid passage space.

4. An articulating mechanism as claimed in claim 2, wherein one of said one end section or said another end section is provided with a blocking member protruding into said fluid passage space so as to block said fluid medium from flowing in a circumferential direction of said fluid passage space.

5. An articulating mechanism as claimed in claim 3, wherein said blocking member is positioned adjacent to an opening section of one of said fluid communication holes disposed in overlapped end sections.

6. An articulating mechanism as claimed in claim 4, wherein said blocking member is positioned adjacent to an opening section of one of said fluid communication holes disposed in overlapped end sections.

7. An articulating mechanism as claimed in any of claims 3–6, wherein a tip dimension of said blocking member is not more than an opening dimension of said fluid communication hole.

8. An articulating mechanism as claimed in any of claims 1–6, wherein said fluid passage space is divided into a plurality of spaces along said shaft axis, and an independent fluid path is provided for each of said spaces to communicate with each of a plurality of fluid communication holes.

9. An articulating mechanism as claimed in claim 7, wherein said fluid passage space is divided into a plurality of spaces along said shaft axis, and an independent fluid path is provided for each of said spaces to communicate with each of a plurality of fluid communication holes.

10. An articulating mechanism as claimed in any of claims 1–6, wherein said end sections are freely detachable from said casing members.

11. An articulating mechanism as claimed in claim 7, wherein said end sections are freely detachable from said casing members.

* * * * *